F MULLER
METHOD OF MAKING MILLING CUTTERS.
APPLICATION FILED AUG. 3, 1918.
1,348,301.
Patented Aug. 3, 1920.
3 SHEETS—SHEET 1.
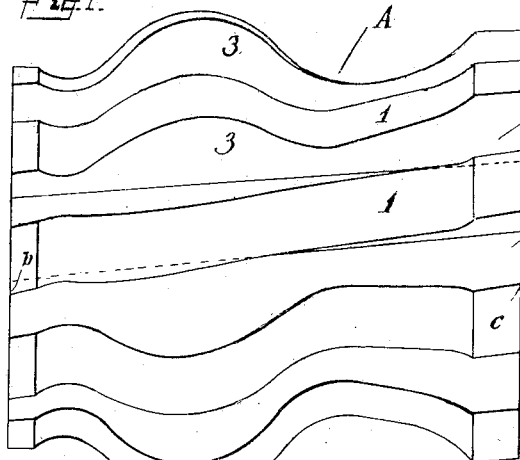
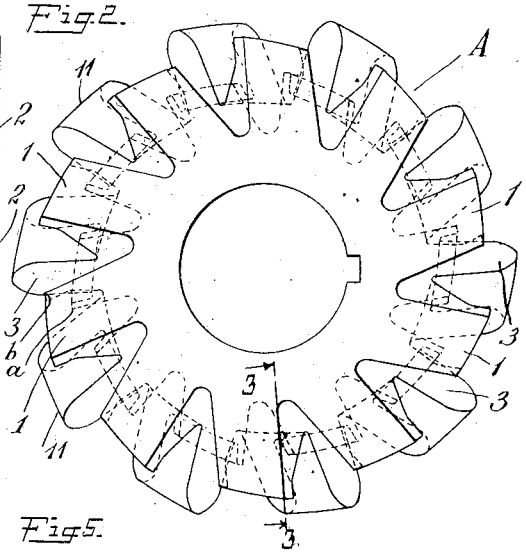
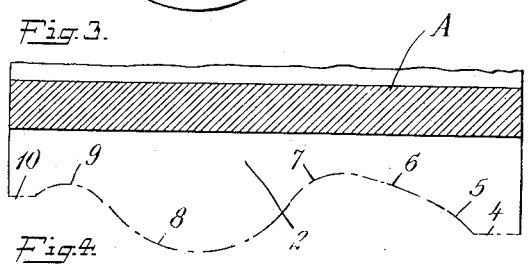
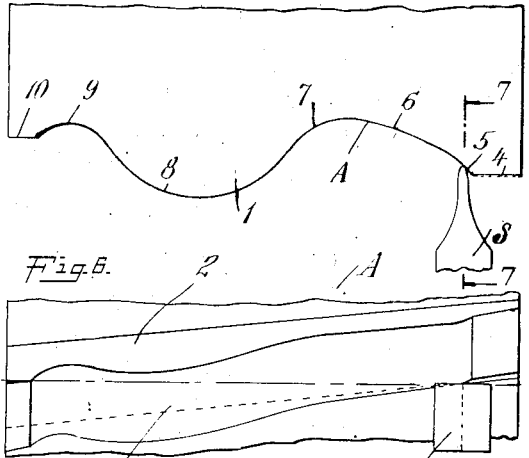
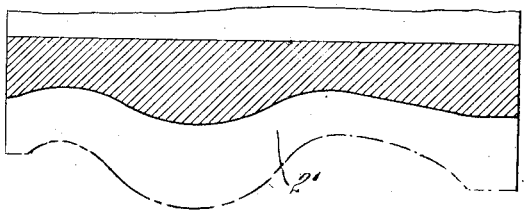
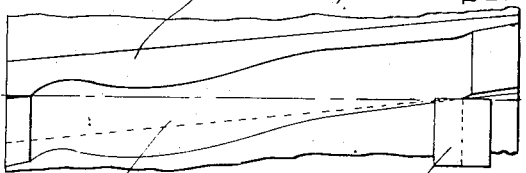
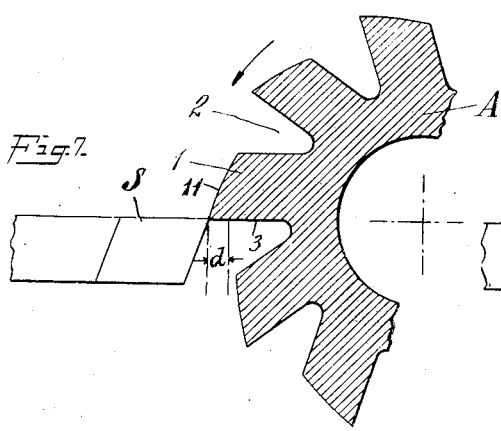
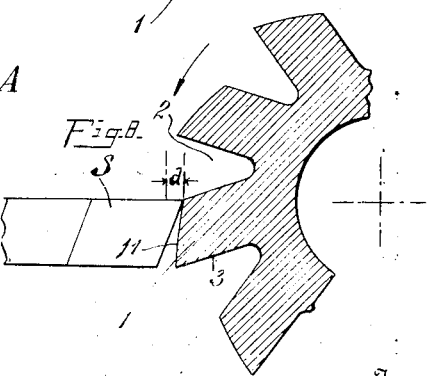
Inventor
Friederich Müller
By S. Jay Teller
Attorney F. MÜLLER.
METHOD OF MAKING MILLING CUTTERS.
APPLICATION FILED AUG. 3, 1918.
1,348,301.
Patented Aug. 3, 1920.
3 SHEETS—SHEET 2.
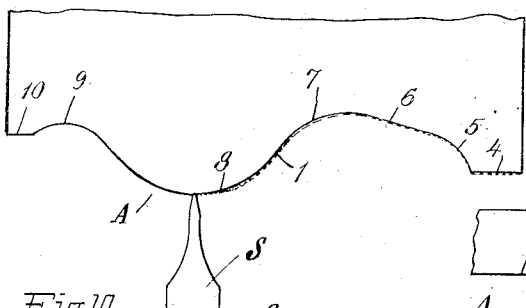
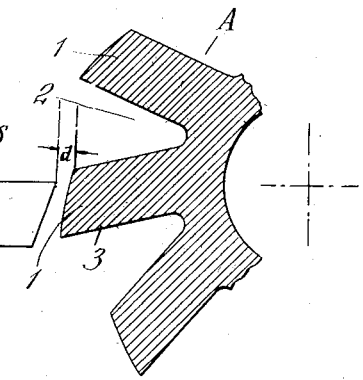
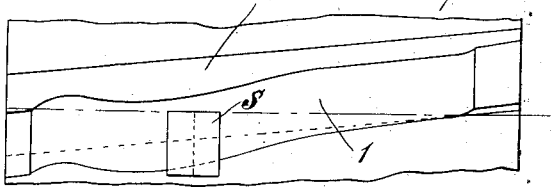
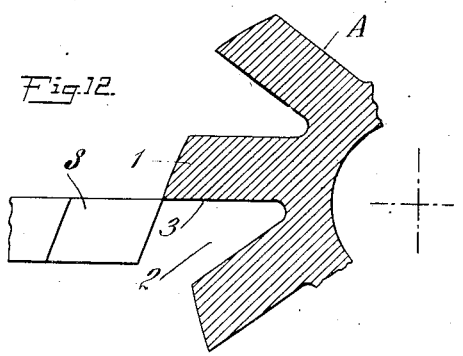
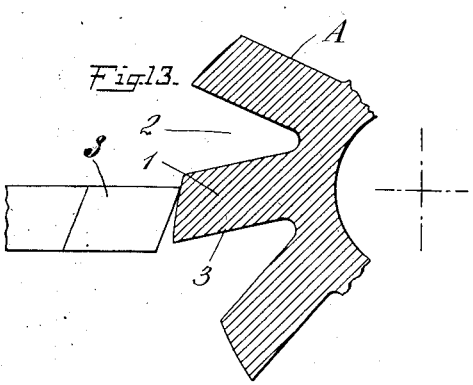
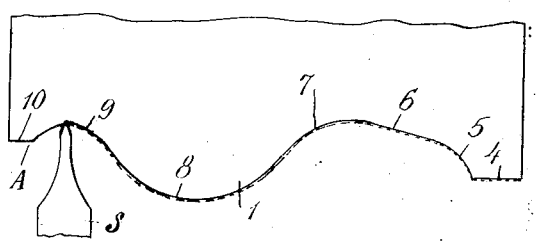
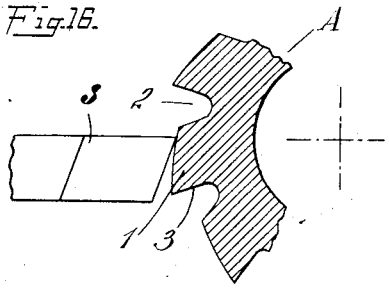
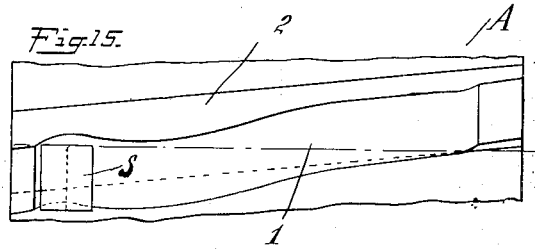
Inventor
Friederich Müller
by S. Jay Teller
Attorney F. MÜLLER.
METHOD OF MAKING MILLING CUTTERS.
APPLICATION FILED AUG. 3, 1918.
1,348,301.
Patented Aug. 3, 1920.
3 SHEETS—SHEET 3.
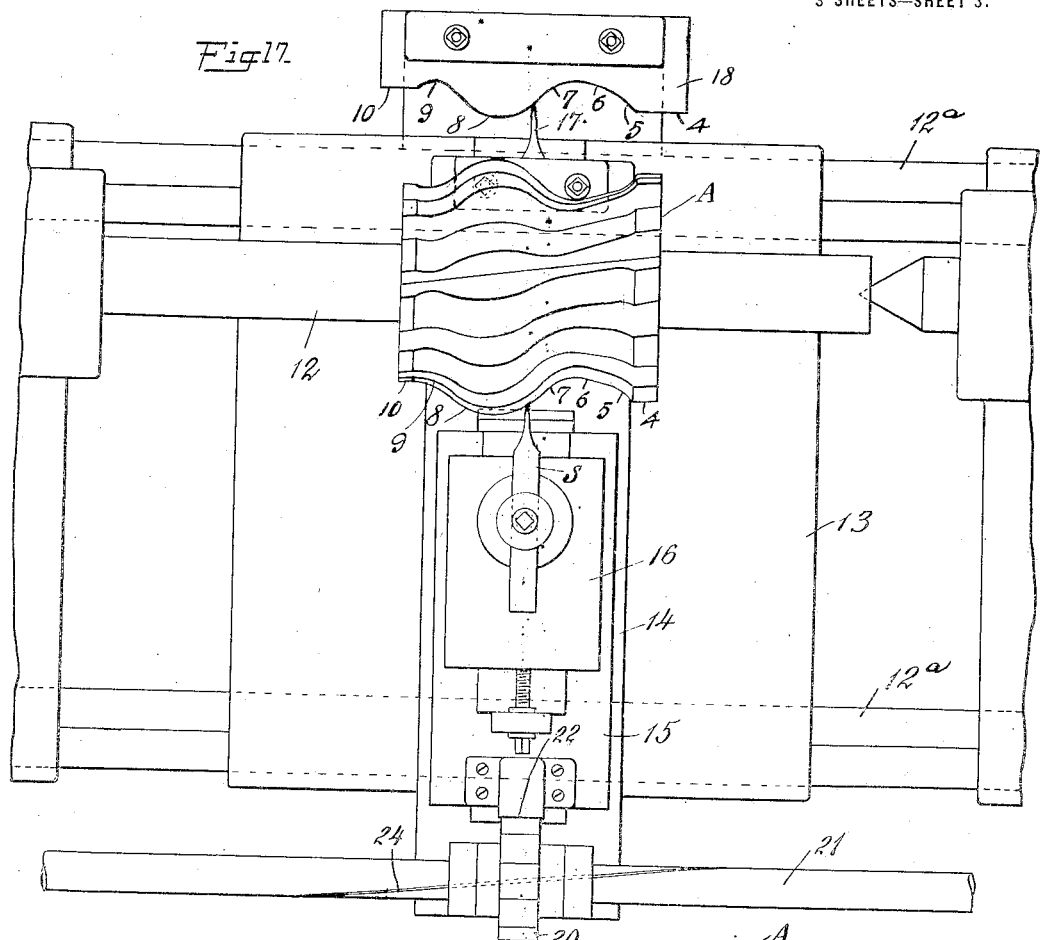
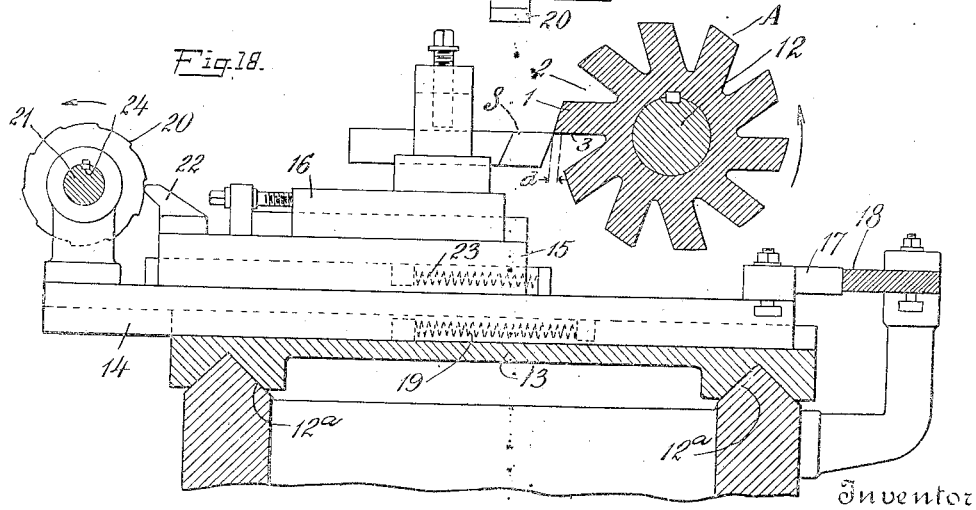
Inventor
Friederich Müller
by S. Jay Teller
Attorney

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,301.  Specification of Letters Patent.  Patented Aug. 3, 1920.

Application filed August 3, 1918. Serial No. 248,190.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed December 26, 1918.

In my copending application for methods of making milling cutters, Serial No. 268,350, filed December 26, 1918, I have shown one method of making milling cutters embodying the invention set forth in my said application Serial No. 268,349, filed December 26, 1918.

In accordance with the method disclosed in the said application, Serial No. 268,350, filed December 26, 1918, the cutter was formed by means of a preliminary milling cutter or a preliminary lathe tool made with a contour corresponding to that to be formed on the final cutter. The preliminary milling cutter or lathe tool engaged the cutter from one end to the other and it was therefore necessary for the teeth of the cutter to be far enough apart to enable the preliminary tool to finish one tooth before engaging the next tooth. When the cutting faces of the teeth were properly inclined this made it necessary either for the cutter to be quite short or for the teeth to be quite far apart. In other words, it was necessary for the teeth to be so arranged as to leave an appreciable angle between the back of the land of one tooth and the front of the land of the next tooth.

In accordance with the present invention I avoid the limitations which were incident to the method set forth in the said application, Serial No. 268,350, filed December 26, 1918. The improved method as herein set forth not only enables me to construct a cutter with overlapping teeth but is also advantageous for constructing any cutter of this type whether with overlapping teeth or not. The method is simple and of general adaptation and does not require the construction of a special preliminary cutting tool as was the case with the method set forth in the said application, Serial No. 268,350, filed December 26, 1918.

In the accompanying drawings I have shown one form of cutter embodying the invention set forth in the said application, Serial No. 268,349, filed December 26, 1918, and one method of making the cutter, but it will be understood that the drawings are merely for purposes of illustration. Particularly it will be observed that the contour of the cutter may be changed at will to meet any desired requirements, and changes may be made as concerns the length of the cutter, the number of teeth, the angle of inclination of the teeth, the relation between the width of the lands and the width of the grooves, etc. It will also be understood that the method illustrated may be varied within the scope of the claims appended to the specification.

Of the drawings:

Figures 1 and 2 are side and end views respectively of a cutter such as may be made in accordance with the invention.

Fig. 3 is a developed fragmentary cross sectional view, the section being taken through the bottom of one of the longitudinal grooves along a helicoidal surface such as 3—3 indicated in Fig. 2.

Fig. 4 is a view similar to Fig. 3 but illustrating a modified form of cutter.

Fig. 5 is a diagrammatic plan view illustrating one step of the method. A lathe tool is shown in engagement with a cutter blank.

Fig. 6 is a fragmentary front view of the elements shown in Fig. 5.

Fig. 7 is a diagrammatic sectional view taken along the lines 7—7 of Figs. 5 and 6.

Fig. 8 is a view similar to Fig. 7 but showing the cutter blank and lathe tool in different relative positions.

Figs. 9 and 10 are views similar respectively to Figs. 5 and 6 but showing the lathe tool in a different position.

Figs. 11, 12 and 13 are diagrammatic views similar to Figs. 7 and 8 and illustrating the relations between the lathe tool and the cutter blank, when the lathe tool is in the general position indicated in Figs. 9 and 10.

Figs. 14 and 15 are views similar respectively to Figs. 5 and 6 and to Figs. 9 and 10 but showing the lathe tool in a third position.

Fig. 16 is a view similar to Figs. 7 and 12 with the lathe tool in the general position illustrated in Figs. 14 and 15.

Fig. 17 is a diagrammatic plan view of a machine adapted for carrying out the method.

Fig. 18 is a cross sectional view of the machine illustrated in Fig. 17.

Referring particularly to Figs. 1, 2 and 3 of the drawings, A represents the cutter as a whole. The cutter is provided with a series of generally longitudinal teeth 1 between which are grooves 2, the teeth and grooves preferably being spaced uniformly. The front faces 3 of the teeth constitute cutting faces and these are shaped to cut a predetermined contour which differs from a straight line. The grooves 2 can be of any usual or preferred depth or shape as required by the spacing and by the depth of the contour. As illustrated in Fig. 3, each groove 2 has a uniform depth throughout; that is, its bottom is parallel with the axis of the cutter. It may, however, be preferable to vary the depth of the groove so that it may conform in a general way to the external contour of the cutter. Such a groove of variable depth is shown at 2′ in Fig. 4.

It will be understood that the contour shown has been selected merely for purposes of illustration and that the outline or contour of the cutter from one end to the other can vary in any practical way that may be desired. The contour may be made up of a series of straight lines, or a series of circular arcs, or a combination of circular arcs and straight lines, or the contour may consist in whole or in part of non-circular curves. As illustrated, particularly in Fig. 3, the contour consists of a straight section 4 parallel with the axis, a concave section 5 in the form of a circular arc, a straight section 6 inclined with respect to the axis, a concave section 7 in the form of a circular arc, a convex section 8 in the form of an elliptical arc, a concave section 9 in the form of a circular arc, and a straight section 10 parallel with the axis.

Each cutting face 3 is radial or approximately radial throughout but its inclined or positioned obliquely so that its longitudinal lines lie at an angle to the axis of the cutter. Preferably the grooves and the teeth in their entireties follow the inclination of the cutting faces 3. By preference, the cutting faces 3 are helicoidal, each conforming to a helicoid formed by a generatrix following the axis of the cutter and also following a helix on a cylinder concentric with the axis. The grooves and the teeth may be inclined in either direction and the degree of inclination may be varied as required.

The outer edge of each cutting face 3 conforms exactly to the contour 4—10, this contour of the cutting face following the helicoidal surface thereof. In other words, each point along the edge of the tooth must be at the proper distance from the axis of the cutter so that when the cutter is rotated the tooth will cut a true contour 4—10 as shown in Fig. 3.

The cutter is relieved along lines 11 extending backward and inward from the outer edges of the cutting faces, this relief being properly constructed notwithstanding the variations in radius at different points along the contour and notwithstanding the variations in angular position resulting from the warped cutting face. Preferably the relief lines 11 are maintained in similar relationship to each other as they extend backward and inward, the relief lines conforming to spirals of Archimedes. The result is that the cutter, at any axial plane of intersecton, has a distorted shape. The effective contour at the cutting face is nevertheless correct as stated, and this correct effective contour is maintained when the inclined or helicoidal faces are ground backward.

With a relatively long contour such as that shown and with the teeth relatively closely spaced, overlapping occurs to a greater or less extent. As illustrated, the front corner b of one tooth is in advance of the rear corner c of the preceding tooth. This overlapping may be even greater than that shown when there is a longer contour or when there is a greater degree of inclination, or when the teeth are more closely spaced.

Taking up now the method of making the milling cutter, it will be understood that the preliminary steps of turning the blank and cutting the grooves therein can be carried on in any usual or preferred way, these not of themselves constituting any part of the present invention. The invention relates particularly to the method of shaping the blank to properly form and relieve the helical teeth so that they will cut a correct contour.

In practising the method, as illustrated in Figs. 5 to 18, use is made of a narrow tool or cutter which is fed along the blank following the contour thereof. This tool or cutter may be of any usual or preferred type, but I prefer and have illustrated a lathe tool S. For roughing out the blank a relatively broad tool may be used, but for finishing it is preferable to use a tool provided with a fine point. The tool is held in operative relationship with a blank A and is fed and guided, preferably toward the left, so as to follow the true contour 4—10. During the cutting operation the blank is axially rotated by any preferred means. The tool is preferably held in parallelism while being fed, and the feeding is preferably effected uniformly from one end of the blank to the other. The tool is preferably very narrow and the amount of feed for each revolution of the blank is less than the width of the tool.

Figs. 5 and 6 show the tool in engagement with the blank, the section 4 and a part of the section 5 of the predetermined contour having already been cut. Fig. 7 is a cross sectional view through the blank at the point of engagement of the tool S, the blank being in the position indicated in Fig. 6. The tool S is shown engaging the front edge of a tooth 1. In order that the teeth of the cutter may be properly relieved, the tool is reciprocated toward and from the blank axis in timed relation to the blank rotation. As illustrated in Fig. 7, the blank is rotated in the direction indicated by the arrow and the tool is reciprocated through an effective distance $d$, the tool being given one complete movement forward and backward for each tooth of the blank. As shown, the tool is in its outer operative position and is about to move inward to cut the relief on the tooth which has just come into engagement with it. Fig. 8 is a view similar to Fig. 7 but showing the cutter advanced so that the tool S is at the rear of the tooth 1. It will be clear that the tool has moved inward to its inner operative position and in so moving has formed the proper relief 11 on the tooth.

Figs. 9 and 10 are views similar to Figs. 5 and 6 but showing the tool S in a different position. It will be understood that the tool in moving from the position shown in Figs. 5 and 6 to the position shown in Figs. 9 and 10 has been fed very slowly and has been properly guided to cut the remainder of the section 5 of the predetermined contour, all of the sections 6 and 7, and a part of the section 8.

I have stated that the tool S is reciprocated in timed relation with the rotation of the cutter blank. This relation is definite with the tool at any given transverse plane, but when the tool is fed longitudinally of the cutter the relationship must be varied to conform to the changing angular position of the outer edge of the cutting face. Fig. 10 shows the cutter blank with the engaged tooth in the same position as in Fig. 6. On account of the inclination of the tooth the point of the tool is near the rear of the tooth instead of at the front thereof as was shown in Figs. 6 and 7. If the same relationship had been maintained between the rotation of the cutter blank and the reciprocation of the tool, the tool would be in the same outermost operative position which it occupied in Fig. 7, thus leaving it out of engagement with the blank, as shown in Fig. 11. Obviously, the relationship between the cutting tool and the blank must be varied in order to enable the tool to cut the necessary relief and at the same time maintain the correct contour. When the front edge of the tooth reaches the point of the tool, the tool must engage the blank and must thereafter continue in engagement as the tooth continues to move past it. The required variation in the relationship may be effected by relatively accelerating the tool reciprocation in proportion to the movement of the tool along the blank, or it may be effected by relatively retarding the rotative movement of the blank. In either case the result is to maintain the tool and the cutter in the proper relationship as the tool is fed. The relation between the rotation of the blank and the reciprocating and relieving movements of the tool are continued and the relative timing is so varied that the tool always engages the front edge of the tooth when the tool is in the outer operative position, as shown in Fig. 12. As the blank rotates to the position shown in Fig. 10 the tool follows the correct line of relief to the position shown in Fig. 13.

Figs. 14 and 15 are views similar respectively to Figs. 5 and 6 and to Figs. 9 and 10, differing, however, by showing the lathe tool in a third position. All of the contour has been cut except a part of the section 9 and the section 10. Fig. 16 is a view similar to Figs. 7 and 13, the lathe tool being in engagement with the surface of the tooth and the tooth itself being in the position shown in Fig. 15.

Figs. 17 and 18 illustrate diagrammatically the essential parts of a machine for carrying out the process as presented in Figs. 6 to 16. This machine is not claimed as a part of the present invention, and in fact so far as this invention is concerned the machine construction can be widely varied. In my copending application, Serial No. 286,524, for relieving machines, filed March 31st, 1919, I have disclosed a machine which has some of the characteristics of that herein diagrammatically illustrated but which, however, is distinctly different as concerns many important features. As illustrated, 12 is a mandrel upon which is carried a cutter blank A. Suitable means are provided for supporting and rotating the mandrel. Longitudinally movable along ways $12^a$, $12^a$ is a carriage 13 upon which is mounted a transversely movable slide 14. Carried by the slide 14 is an independently movable transverse slide 15 which carries the tool S, there preferably being an intermediate slide 16 by means of which preliminary adjustments may be effected. Secured to the slide 14 is a former pin 17 the shape of which, in horizontal cross sectional outline, corresponds to that of the tool S, preferably being exactly the same. Secured to the main frame of the machine is a former plate 18 which has a contour 4—10 which is exactly the same as the desired effective contour of the finished cutter. A spring 19 is provided for pressing the slide 14 toward the rear and thus holding the former pin 17 always in engagement with the plate 18. It will be seen that when the carriage 13 is moved longitudinally the slide 14 will be caused to move transversely under the guidance of the former, the tool S thus being caused to follow an outline which is exactly the same as that of the former plate 18.

A cam 20 is splined to a shaft 21 which is rotatably mounted on the slide 14. The cam 20 has as many lobes as the cutter has teeth. The cam and the shaft are bodily movable in accordance with the transverse movements of the slide 14. When the slide 14 moves longitudinally with the carriage 13 the cam 20 moves along the shaft, the shaft itself being fixed against longitudinal movement. Thus the cam 20 partakes of all of the bodily movements of the slide 14. A finger 22 secured to the slide 15 engages the cam and a spring 23 is provided for pressing the slide 15 outward, thus holding the finger 22 against the cam. Suitable means, not fully shown, are provided for rotating the shaft 21 in timed relation with the mandrel 11, the shaft being given one complete rotation for each complete revolution of the blank A. The groove or keyway 24 of the shaft 21 is helical in form and has the same degree of inclination as the teeth of the blank A. The result is that when the tool S is moved longitudinally of the blank the cam 20 is moved along the shaft 21. On account of the helical keyway the cam not only partakes of the normal rotative movement of the shaft but is given a supplemental rotative movement, this supplemental movement being exactly correct in amount to cause the tool, when in its outermost operative position at each reciprocation, to engage the front edge of a tooth of the cutter.

In operation, a former 18 is selected having exactly the predetermined contour, and a former pin 17 is selected which has exactly the cross sectional shape of the tool S which is to be used. A blank A is put in place, as shown, this blank having previously been roughed out and grooved in any usual or preferred way. By means of the slide 16 the tool is adjusted into engagement with the blank at its right-hand end and the movement of the machine is started. The blank A rotates and the tool is given a reciprocating movement to effect the relief. The point of the tool engages the front edge of each tooth when the tool is in its outermost operative position. By means of the slide 15 the tool is fed slowly toward the left, the rotative movement of the blank and the reciprocating movement of the tool being continued. By means of the former and the former pin, the slide 14 is moved inward and outward but, inasmuch as the cam 20 is movable with the slide, the reciprocating relieving movements of the tool S are continued without interruption. Inasmuch as the cam 20 moves longitudinally along the shaft 21 as the tool is fed, the reciprocating and relieving movements of the tool are slightly advanced, thus causing the tool to engage the blank at the proper times notwithstanding the inclination of the cutting faces thereof.

Inasmuch as the tool S is very narrow, it has practically a point contact with the blank. I thus avoid any errors which would result from the use of a broad tool which would engage the blank sometimes at one side and sometimes at the other. The longitudinal feeding movement of the tool is uniform throughout and is preferably at a slow rate, the advance for each revolution of the blank being less than the width of the tool.

The former can have any desired contour, no matter how irregular, and thus any desired contour, no matter how irregular, can be given to the finished cutter A.

In following the method, the contour of the former is followed exactly so as to provide the cutter teeth with contours which will reproduce the former contour exactly. There are no errors in the contour which are in any way dependent upon differences in diameter of the cutter at different positions along the contour.

It will be seen that in accordance with my invention it is possible to construct a cutter with any desired practical effective contour without the use of any specially constructed cutting tools. The same tool may be used for various contours, it being merely necessary to provide formers having the contours desired for the cutters.

What I claim is:

1. The herein described method of shaping a spirally relieved milling cutter having helicoidal cutting faces adapted to cut a predetermined contour other than a straight line, the method consisting in axially rotating a blank having teeth with helicoidal front faces, in providing a very narrow cutting tool in position to cut the blank, in feeding the tool from one end of the blank to the other, the amount of feed for each revolution of the blank being less than the width of the tool, in guiding the tool as it is fed to follow the said contour, and in reciprocating the tool as it is fed in timed but varying relation to the rotation of the blank to provide the required relief.

2. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool in position to cut the blank, in effecting a uniform feeding of the tool from one end of the blank to the other, in guiding the tool as it is fed to follow the said contour, and in reciprocating the tool as it is fed in timed but varying relation to the rotation of the blank to provide the required relief.

3. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool in position to cut the blank, in feeding the tool from one end of the blank to the other, in guiding the tool as it is fed to follow the said contour, the tool being held in parallelism during such feeding and guiding, and in reciprocating the tool as it is fed in timed but varying relation to the rotation of the blank to provide the required relief.

4. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool in position to cut the blank, in effecting a uniform feeding of the tool from one end of the blank to the other, in guiding the tool as it is fed to follow the said contour, the tool being held in parallelism during such feeding and guiding, and in reciprocating the tool as it is fed in timed but varying relation to the rotation of the blank to provide the required relief.

5. The herein described method of shaping a spirally relieved milling cutter having helicoidal cutting faces adapted to cut a predetermined contour other than a straight line, the method consisting in axially rotating a blank having teeth with helicoidal front faces, in providing a very narrow cutting tool in position to cut the blank, in feeding the tool from one end of the blank to the other, the amount of feed for each revolution of the blank being less than the width of the tool, in guiding the tool as it is fed to follow the said contour, the tool being held in parallelism during such feeding and guiding, and in reciprocating the tool as it is fed in timed but varying relation to the rotation of the blank to provide the required relief.

6. The herein described method of shaping a spirally relieved milling cutter having helicoidal cutting faces adapted to cut a predetermined contour other than a straight line, the method consisting in axially rotating a blank having teeth with helicoidal front faces, in providing a non-rotary cutting tool in position to cut the blank, in effecting a uniform feeding of the tool from one end of the blank to the other, in guiding the tool as it is fed to follow the said contour, the tool being held in parallelism during such feeding and guiding, and in reciprocating the tool as it is fed in timed but varying relation to the rotation of the blank to provide the required relief.

7. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool, in providing a stationary former having the said predetermined contour and a companion former pin having a shape corresponding to the shape of the cutting tool, and in cutting the contour of the relieved final milling cutter by means of the cutting tool, the tool being guided by the said former and former pin to follow the predetermined contour and being reciprocated in timed but varying relation to the rotation of the blank to provide the required relief.

8. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool, in providing a stationary former having the said predetermined contour and a companion former pin having a shape corresponding to the shape of the cutting tool, and in cutting the contour of the relieved final milling cutter by means of the cutting tool, the tool being guided by the said former and former pin to follow the predetermined contour while being held in parallelism and being reciprocated in timed but varying relation to the rotation of the blank to provide the required relief.

9. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool in position to cut the blank, in providing a stationary former having the said predetermined contour and a companion former pin having a shape corresponding to the shape of the cutting tool, and in effecting a uniform feeding of the tool from one end of the blank to the other, the tool being guided by the said former and former pin to follow the predetermined contour and being reciprocated in timed but varying relation to the rotation of the blank to provide the required relief.

10. The herein described method of shaping a spirally relieved milling cutter having helicoidal cutting faces adapted to cut a predetermined contour other than a straight line, the method consisting in axially rotating a blank having teeth with helicoidal front faces, in providing a very narrow cutting tool in position to cut the blank, in providing a stationary former having the said predetermined contour and a companion former pin having the same shape as the cutting tool, and in effecting a uniform feeding of the tool from one end of the blank to the other, the amount of feed for each revolution of the blank being less than the width of the tool, the tool being guided during feeding by the said former and former pin to follow the predetermined contour and being reciprocated in timed but varying relation to the rotation of the blank to provide the required relief.

11. The herein described method of shaping a spirally relieved milling cutter having helicoidal cutting faces adapted to cut a predetermined contour other than a straight line, the method consisting in axially rotating a blank having teeth with helicoidal front faces, in providing a non-rotary cutting tool in position to cut the blank, in providing a former having the said predetermined contour and a companion former pin having a shape corresponding to the shape of the cutting tool, and in effecting a uniform feeding of the tool from one end of the blank to the other, the tool being guided by the said former and former pin to follow the predetermined contour and being reciprocated in timed but varying relation to the rotation of the blank to provide the required relief.

12. The herein described method of shaping a spirally relieved milling cutter having helicoidal cutting faces adapted to cut a predetermined contour other than a straight line, the method consisting in axially rotating a blank having teeth with helicoidal front faces, in providing a cutting tool, in providing a former having the said predetermined contour and a companion former pin having a shape corresponding to the shape of the cutting tool, in utilizing the former and former pin to guide the cutting tool and cause it to follow the predetermined contour and thus cut the contour of the final milling cutter, and in reciprocating the tool in timed relation to the rotation of the blank, the relation between the reciprocation of the tool and the rotation of the blank being varied in proportion to the movement of the tool longitudinally of the blank axis to thus provide the required relief.

13. The herein described method of shaping a spirally relieved milling cutter having helicoidal cutting faces adapted to cut a predetermined contour including non-circular curves, the method consisting in axially rotating a blank having teeth with helicoidal front faces, in providing a cutting tool, in providing a former having the said predetermined contour and a companion former pin having a shape corresponding to the shape of the cutting tool, and in cutting the contour of the relieved final milling cutter by means of the cutting tool, the tool being guided by the said former and former pin to follow the predetermined contour and being reciprocated in timed but varying relation to the rotation of the blank to provide the required relief.

In testimony whereof I hereto affix my signature.

FRIEDERICH MÜLLER.

It is hereby certified that in Letters Patent No. 1,348,301, granted August 3, 1920, upon the application of Friederich Müller, of Hartford, Connecticut, for an improvement in "Methods of Making Milling-Cutters," errors appear in the printed specification requiring correction as follows: Page 2, line 76, for the word "its" read *is;* page 6, line 56, claim 11, before the word "former" insert the word *stationary;* and that the said Letters Patent should be read with these corrections therein that the same may conform to the record of the case in the Patent Office.

Signed and sealed this 28th day of September, A. D., 1920

[SEAL.]

M. F. COULSTON,
*Acting Commissioner of Patents.*

Cl. 76—101.